United States Patent
Carlstedt et al.

(10) Patent No.: US 6,793,234 B2
(45) Date of Patent: Sep. 21, 2004

(54) STEERING WHEEL FEEDBACK MECHANISM

(75) Inventors: Robert P. Carlstedt, Rochester Hills, MI (US); James B. Chamberlin, Charlotte, NC (US); Ragnar H. Ledesma, Sterling Heights, MI (US); Nancy L. Saxon, Oakland Township, MI (US); Dennis A. Kramer, Troy, MI (US); Doyle R. Downey, Beverly Hills, MI (US); Joseph Cubalchini, Jr., St. Charles, IL (US); Monte G. Williams, Royal Oaks, MI (US)

(73) Assignee: Meritor Light Vehicle Technology, LLC, Troy, MI (US)

(*) Notice: Subject to any disclaimer, the term of this patent is extended or adjusted under 35 U.S.C. 154(b) by 16 days.

(21) Appl. No.: 09/981,127

(22) Filed: Oct. 17, 2001

(65) Prior Publication Data

US 2003/0070863 A1 Apr. 17, 2003

(51) Int. Cl.$^7$ ................................. B62D 5/04
(52) U.S. Cl. .................................... 280/446
(58) Field of Search .......................... 180/421, 422, 180/446, 402, 403; 701/42

(56) References Cited

U.S. PATENT DOCUMENTS

| | | | |
|---|---|---|---|
| 3,936,071 A | 2/1976 | Ricketts, Jr. et al. | |
| 4,135,436 A | 1/1979 | Duffy | |
| 4,573,705 A | 3/1986 | Kanai et al. | |
| 4,673,051 A | 6/1987 | Darling et al. | |
| 4,865,148 A | 9/1989 | Marumoto et al. | |
| 4,974,875 A | 12/1990 | Sugasawa et al. | |
| 5,177,681 A | 1/1993 | Sato | |
| 5,236,335 A * | 8/1993 | Takeuchi et al. | 180/446 |
| 5,271,475 A * | 12/1993 | Takeshita | 180/446 |
| 5,301,617 A * | 4/1994 | Miwa et al. | 180/168 |
| 5,347,458 A * | 9/1994 | Serizawa et al. | 701/41 |
| 5,880,367 A * | 3/1999 | Vaughn | 73/488 |
| 5,947,084 A | 9/1999 | Russell et al. | |
| 6,079,513 A * | 6/2000 | Nishizaki et al. | 180/402 |
| 6,152,254 A * | 11/2000 | Phillips | 180/422 |
| 6,176,341 B1 * | 1/2001 | Ansari | 180/402 |
| 6,178,365 B1 * | 1/2001 | Kawagoe et al. | 701/41 |
| 6,212,453 B1 * | 4/2001 | Kawagoe et al. | 701/41 |
| 6,226,592 B1 * | 5/2001 | Luckscheiter et al. | 701/301 |
| 6,283,243 B1 * | 9/2001 | Bohner et al. | 180/406 |
| 6,484,839 B2 * | 11/2002 | Cole | 180/402 |
| 6,499,559 B2 * | 12/2002 | Mc Cann et al. | 180/446 |
| 6,523,637 B1 * | 2/2003 | Nakano et al. | 180/402 |
| 6,547,031 B1 * | 4/2003 | Magnus | 180/444 |

* cited by examiner

Primary Examiner—Lesley D. Morris
Assistant Examiner—Paul Royal, Jr.
(74) Attorney, Agent, or Firm—Carlson, Gaskey & Olds

(57) ABSTRACT

A steering system comprises a steering wheel and a feedback mechanism in communication with the steering wheel. A control unit communicates with a sensor and controls the feedback mechanism based on the signal from the sensor. The feedback mechanism may cause tactile feedback in the steering wheel. The feedback mechanism is most preferably incorporated by controlling a solenoid valve in a power steering circuit for the vehicle. By repeatedly actuating the solenoid valve, vibration can be caused in the steering wheel.

6 Claims, 1 Drawing Sheet

STEERING WHEEL FEEDBACK MECHANISM

BACKGROUND OF THE INVENTION

This invention relates to a method and system for providing vehicle handling feedback to an operator of a motor vehicle.

With the advent of improved suspension systems, a driver of a motorized vehicle has become increasingly isolated from the feel of the road and the vehicle's response to the road. Accordingly, a driver receives little feedback from the vehicle relating to its handling. For example, a driver taking a turn at an excessive speed may not feel the lateral roll of the vehicle. In addition, if the driver brakes excessively, he may not necessarily feel the vehicle slipping. The absence of feedback is undesirable, resulting in less than optimal vehicle control by the driver.

Systems do exist that provide the driver with some feedback relating to the undesired movement of the vehicle. ABS systems are currently equipped to provide feedback through a signal on the dashboard that may flash when the vehicle is slipping. However, a driver focusing on the road may miss or ignore this feedback.

A need therefore exists for a method and system of providing feedback to the driver relating to the undesired movement of the vehicle without requiring significant attention from the driver to notice.

SUMMARY OF THE INVENTION

The present invention provides feedback about the movement of a vehicle through the vehicle's steering wheel. The steering system comprises a vehicle steering wheel and a feedback mechanism providing feedback through the steering wheel. A sensor obtains information about the movement of the vehicle and communicates this information to a control unit. The control unit controls the feedback mechanism based on the input from the sensor.

The feedback mechanism may cause tactile feedback in the steering wheel so that the driver may keep his eyes focused on the road while still receiving feedback through the steering wheel. The feedback preferably is applied as vibration of the steering wheel.

As commonly found on vehicles today, a power steering unit may assist steering of the vehicle. In this instance, the steering wheel may be vibrated by controlling a solenoid valve of the power steering unit—a valve common in such a unit. If the power steering unit does not employ a solenoid valve, one may be easily added. By pulsing the solenoid valve, hydraulic fluid to a hydraulic pump of the power steering unit may be interrupted. Each interruption causes the steering wheel to vibrate. Hence, with little additional componentry, the invention may be implemented into existing power steering systems.

The sensor of the invention detects movement of the vehicle, such as vehicle roll or vehicle slip. The sensor may already be part of an existing ABS brake system and tied to the control unit that controls the feedback mechanism. Additionally, an accelerometer may be used to provide information about the lateral roll forces experienced by the vehicle.

The level of feedback fed through the steering wheel may depend on the level of movement of the vehicle. In this way, a driver may be provided with increasing levels of feedback as the level of undesirable movement increases. For example, as vehicle slippage increases, the level of vibration of the steering wheel may also increase, thereby providing greater warning to the driver of the undesirable movement of the vehicle.

Accordingly, the invention senses movement of the vehicle and communicates this movement to a control unit. A driver receives feedback of the movement of the vehicle through the steering wheel based on the sensed movement. Thus, the invention provides feedback that the driver may otherwise fail to notice and does so without significant additional expense in the manufacture of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
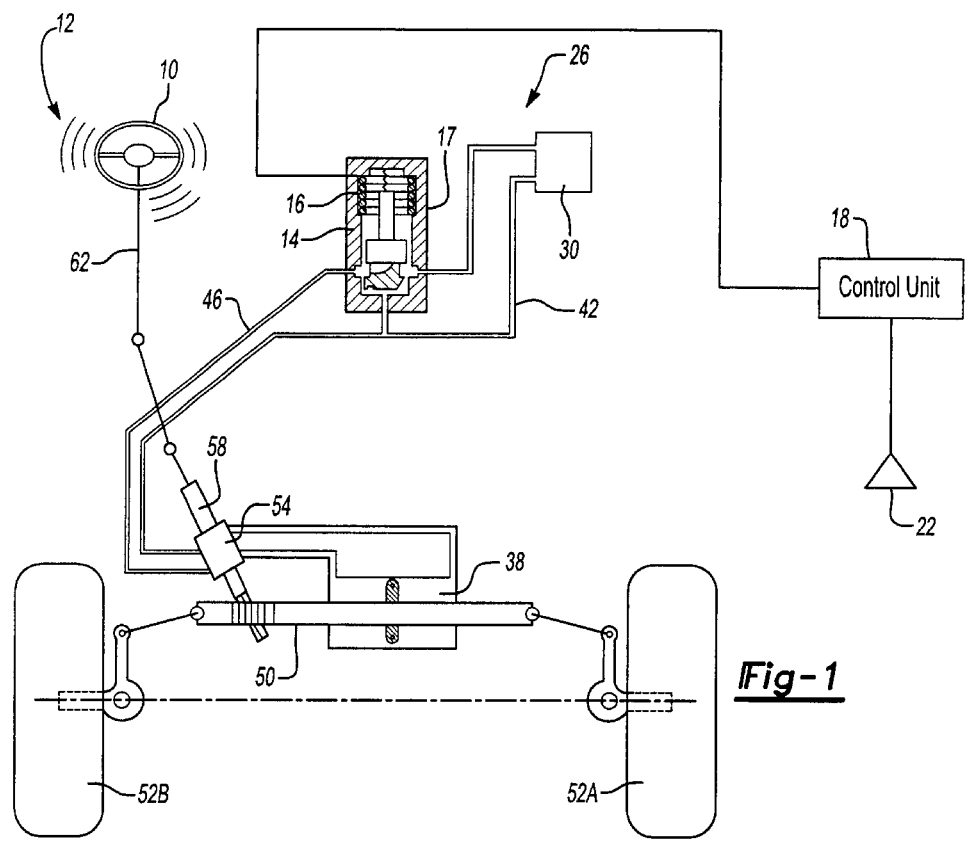
FIG. 1 shows a schematic view of an embodiment of the invention including steering wheel, control unit, sensor, and feedback mechanism.

The invention is schematically shown in FIG. 1 in the form of a system on a vehicle, such as an automobile. Shown are the steering wheel 10, feedback mechanism 14, control unit 18 and sensor 22. These components serve to create vehicle handling feedback and communicate this feedback to an operator through steering wheel 10.

Sensor 22 may comprise a movement sensor that tracks the movement of the vehicle. An ABS brake slip sensor, an accelerometer, other generally known and available sensors for detecting vehicle movement may be employed. Sensor 22 may sense vehicle slip, lateral roll and any other movement of the vehicle for which a driver may require feedback.

Data is transmitted from sensor 22 in the form of a signal to control unit 18. Control unit 18 then controls feedback mechanism 14, such as a solenoid valve. Feedback mechanism 14 is operatively connected to steering wheel 10, communicating feedback through steering wheel 10. The feedback is based on data from sensor 22 and may comprise tactile feedback including vibration 12 of the steering wheel 10.

The present invention may easily be installed into existing power steering systems. FIG. 1 illustrates such an embodiment. As known, power steering unit 26 comprises hydraulic pump 30, solenoid valve 14, rack shaft power cylinder 38, pinion shaft 58 and control valve 54.

Generally, hydraulic fluid flows from hydraulic pump 30 through pressure line 42 to control valve 54, which selectively transmits the hydraulic pressure to rack shaft power cylinder 38 in accordance with the direction of rotation of steering wheel 10. Thus, steering wheel 10 is in communication with the hydraulic flow of fluid through power steering unit 26.

Fluid is returned to hydraulic pump 30 through return line 46 and travels through control valve 54 to solenoid valve 14. Solenoid valve 14 is in communication with control unit 18. As known, solenoid valve 14 controls the quantity of hydraulic fluid returned to hydraulic pump 30, thereby adjusting the hydraulic pressure applied to rack shaft power cylinder 38. In this way, steering may be powered. The normal function of solenoid valve 14 is known. This invention controls the valve 14 in a unique fashion.

While power steering units are well-known, the inventive feature of this system amounts to the control of solenoid valve 14 by control unit 18 based on sensed data from sensor 22. When control unit 18 detects undesirable movement of a vehicle, it actuates solenoid valve 14 by controlling the current through coil 16. Valve 17, as known, opens and closes through the fluctuation of this current. Accordingly, the flow of fluid through power steering unit 26 may be controlled and fluctuated by control unit 18 through solenoid valve 14. The rapid fluctuation of this hydraulic fluid will result in vibration 12 of steering wheel 10 as hydraulic pressure drops momentarily through power steering unit 26. The rapid drops and rises amount to pulsing hydraulic fluid that imparts pulsing energy to control valve 54. This pulsing is transformed into vibration of control valve 54, pinion shaft 58, steering shaft 62, and ultimately into vibration 12 of steering wheel 10.

In this way, when control unit 18 detects undesirable movement of the vehicle, control unit causes solenoid valve 14 to rapidly fluctuate and steering wheel 10 to vibrate. A driver will thereby receive tactile feedback of the movement of the vehicle without having to take his eyes off the road.

Figure 2:
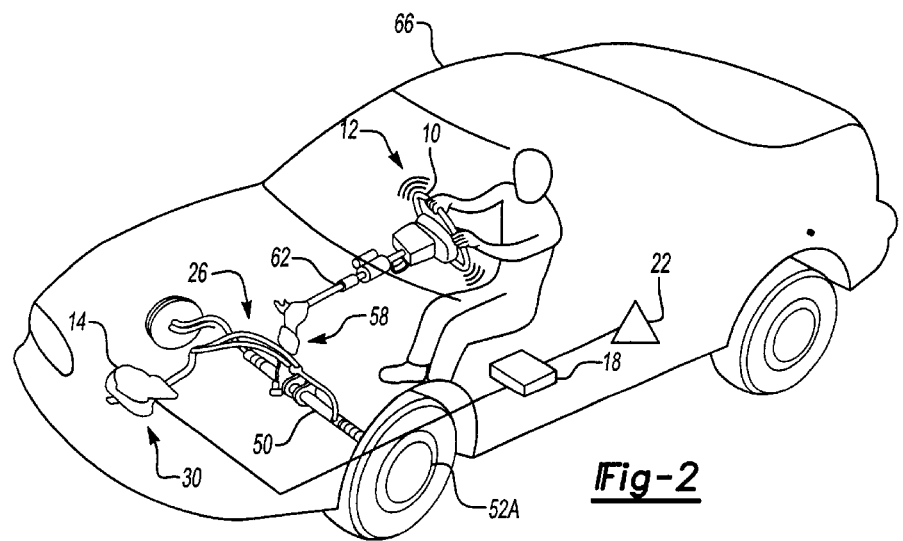
FIG. 2 shows the embodiment of FIG. 1 in the environment of a vehicle.

FIG. 2 illustrates the embodiment of FIG. 1 in automobile 66. Steering wheel 10, control unit 18, sensor 22 and power steering unit 26 are shown. As sensor 22 detects movement of vehicle 66, say lateral roll, this data is communicated in the form of vibration 12 of steering wheel 10 to the driver. The level of vibration may be tied to the level of undesirable movement of vehicle 66, thereby providing the operator with an increasing or decreasing level of feedback based on the level of movement of vehicle 66. Control unit 18 preferably initiates vibration 12 only when it detects a signal from sensor 22 above a predetermined threshold. Thus, in this way, both the onset and level of feedback may be set to what may be considered undesirable movement.

The aforementioned description is exemplary rather than limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason, the following claims should be studied to determine the true scope and content of this invention.

We claim:

1. A steering system comprising:

a steering wheel for a vehicle;

a feedback mechanism for communicating with said steering wheel;

a control unit for controlling said feedback mechanism;

a sensor for communicating with said control unit for detecting undesirable movement of the vehicle, said control unit for controlling said feedback mechanism to communicate a signal to the driver;

wherein said feedback mechanism causes tactile feedback in said steering wheel;

wherein said tactile feedback comprises vibration in said steering wheel;

a power steering unit for communicating with said steering wheel, said power steering unit for assisting steering of the vehicle;

wherein said power steering unit comprises a hydraulic pump and a solenoid valve controlling fluid flow to said hydraulic pump; and wherein said feedback mechanism comprises said solenoid valve in communication with said control unit, interrupting fluid flow of said power steering unit and thereby causing vibration of said steering wheel.

2. A steering system comprising:

a steering wheel for a vehicle;

a feedback mechanism for causing tactile feedback in said steering wheel, a portion of said feedback mechanism including a solenoid valve incorporated into a power steering mechanism for the vehicle;

a control unit controlling said feedback mechanism, said control unit for actuating said solenoid valve to cause vibration in said steering wheel and to selectively cause vibration in said steering wheel; and a sensor in communication with said control unit, said sensor detecting undesirable movement in the vehicle, and sending the signal to said control unit of the undesired movement, said control unit for selectively actuating said solenoid valve.

3. A method of providing feedback to a vehicle operator comprising the steps of:

sensing movement of a vehicle;

communicating the movement of the vehicle to a control unit;

causing feedback in a steering wheel of the vehicle based on the sensed movement; and wherein causing feedback comprises pulsing hydraulic fluid to thereby vibrate the steering wheel.

4. The method of claim 3 wherein the sensed movement relates to a lateral roll of the vehicle.

5. The method of claim 3 wherein the sensed movement relates to vehicle slip.

6. The method of claim 3 wherein a level of feedback varies with a level of movement of the vehicle.

* * * * *

UNITED STATES PATENT AND TRADEMARK OFFICE
CERTIFICATE OF CORRECTION

PATENT NO. : 6,793,234 B2
DATED : September 21, 2004
INVENTOR(S) : Carlstedt et al.

It is certified that error appears in the above-identified patent and that said Letters Patent is hereby corrected as shown below:

<u>Title page,</u>
Item [75], Inventors, the residence for "Monte G. Williams", should read as
-- Royal Oak --

Signed and Sealed this

Ninth Day of November, 2004

JON W. DUDAS
*Director of the United States Patent and Trademark Office*